United States Patent [19]

Feddersen et al.

[11] Patent Number: 4,763,778
[45] Date of Patent: Aug. 16, 1988

[54] EASILY CHANGEABLE GRIPPING HEAD FOR BLOW-MOLDING PALLET ASSEMBLY

[75] Inventors: Frederick J. Feddersen, Londonderry; Earl Snyder, Jr., Manchester, both of N.H.

[73] Assignee: Fedders Machine and Tool Co., Inc., Londonderry, N.H.

[21] Appl. No.: 69,327

[22] Filed: Jul. 2, 1987

Related U.S. Application Data

[63] Continuation-in-part of Ser. No. 879,535, Jun. 23, 1986, Pat. No. 4,684,012, which is a continuation of Ser. No. 628,449, Jul. 6, 1984, abandoned.

[51] Int. Cl.⁴ .............................................. B65G 29/00
[52] U.S. Cl. ............................ 198/803.01; 198/375; 198/803.8; 425/534; 403/348; 269/287; 269/254 R
[58] Field of Search ........... 198/803.01, 803.8, 803.15, 198/375, 465.1; 294/86.4, 99.1; 901/41; 425/534; 403/348, 349, 353; 269/287, 254 R, 99, 100

[56] References Cited

U.S. PATENT DOCUMENTS

| | | | |
|---|---|---|---|
| 852,345 | 4/1907 | Paul | 198/803.01 |
| 3,082,985 | 3/1963 | Herdman | 403/348 X |
| 3,538,997 | 11/1970 | Christine et al. | 198/803.01 |
| 4,185,812 | 1/1980 | Hall | 198/345 X |

FOREIGN PATENT DOCUMENTS 103071  6/1962  Netherlands ............... 198/803.8

Primary Examiner—Robert J. Spar
Assistant Examiner—Cheryl L. Gastineau
Attorney, Agent, or Firm—Hayes, Davis & Soloway

[57] ABSTRACT

An easily replaceable collet assembly for use in a movable pallet containing a plurality of stations for releasably gripping and rotating a plurality of resin preforms as they are moved through a blow molding process for providing rapid reconfiguration of the stations to accept different sized preforms. There is a mounting member carried by the pallet for rotation, the mounting member comprising a mounting plate perpendicular to a rotatable shaft connecting it to the pallet; a locking member carried by the mounting member for rotation about the shaft; and, a collet member for releasably gripping a preform of a given size, the collet member including locking apparatus for interacting with the locking member to releasably attach the collet member to the mounting plate to be moved in combination therewith.

23 Claims, 3 Drawing Sheets

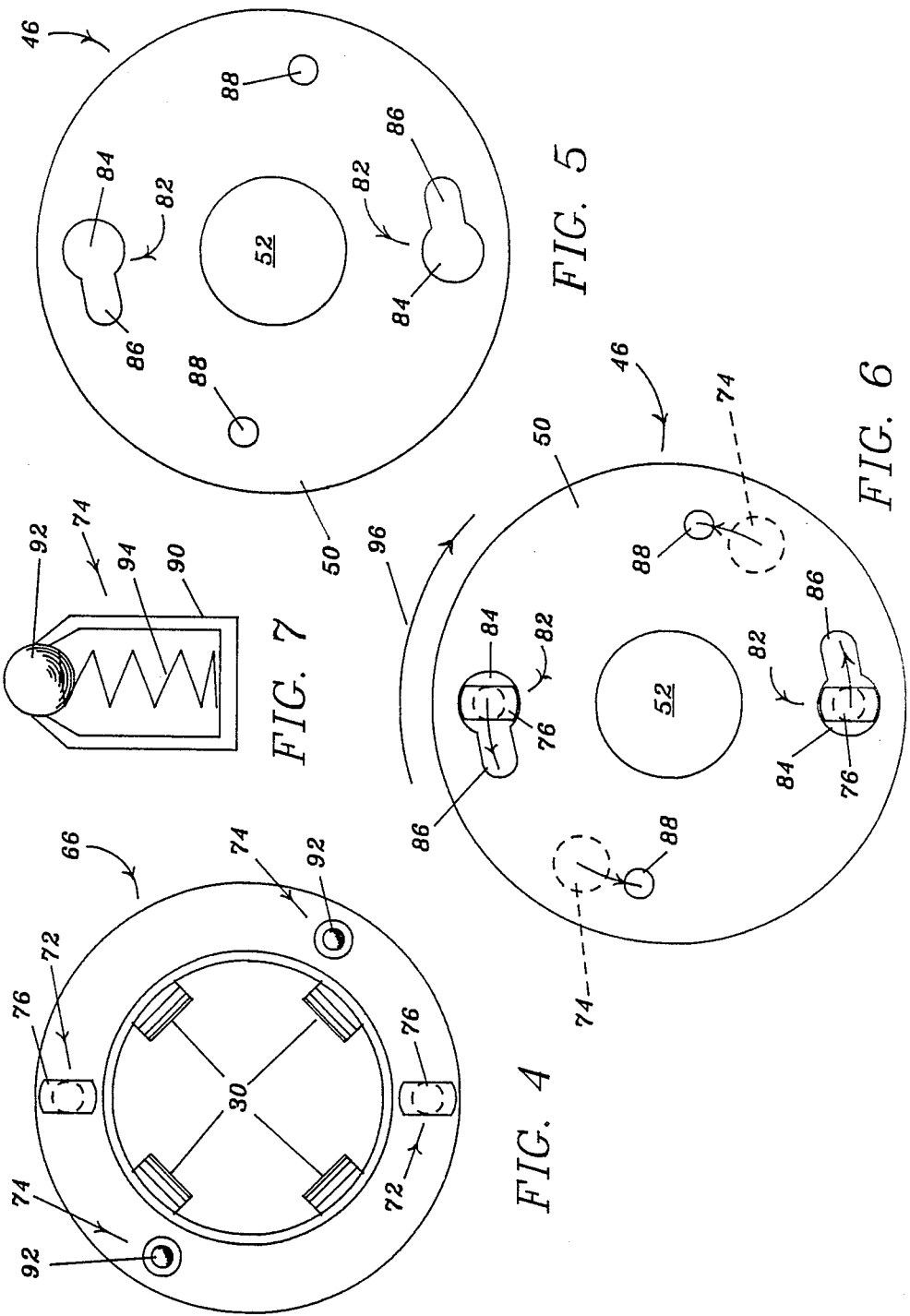

EASILY CHANGEABLE GRIPPING HEAD FOR BLOW-MOLDING PALLET ASSEMBLY

BACKGROUND OF THE INVENTION

This application is a continuation-in-part of application Ser. No. 879,535, filed June 23, 1986, now U.S. Pat. No. 4,684,012, which, in turn, is a continuation of application Ser. No. 628,449, filed July 6, 1984, now abandoned.

The present invention relates an improvement in a pallet assembly for transferring one or more workpieces between locations during which transfer a manufacturing operation takes place and, more particularly, to an easily replacable collet assembly for use in a movable pallet containing a plurality of stations for releasably gripping a plurality of workpieces as they are moved through a manufacturing process for providing rapid reconfiguration of the stations to accept different sized workpieces, said collet assembly comprising, a mounting member carried by the pallet, the mounting member including a mounting plate connected to the pallet; a locking member carried by the mounting member; and, a collet member for releasably gripping a workpiece of a given size, said collet member including locking means for interacting with said locking member to releasably attach said collet member to said mounting plate to be moved in combination therewith.

Blow-molding thermo-plastic organic resins to form hollow container such as bottles for beer, carbonated beverages, and the like, is a known art and is the preferred use of the present invention. Suitable thermoplastic resins include resins which are biaxially orientable such as polyethylene, terephthalate, and polypropylene. The biaxial orientation property requires delivering the resin to the blow-mold at a temperature where it can so orient, which is generally within the range between the resin softening point and the resin melting point. The resin should also be heated evenly over the portions to be blown in order to produce an evenly expanded final product. The present invention is an improvement to a pallet assembly as disclosed in the above-referenced applications of applicant and provides a means to easily and quickly changeably transport an injection-molded preform made of the resin from a preheating oven or other means for adjusting temperature (e.g, through a cooler from the injection-mold) to the blow-mold thence to a discharge point; or more broadly, from one location where the means is loaded with a workpiece, through a manufacturing location such as a blow-molding procedure, then to a second location for discharge.

The present invention is adapted to be easily changeable so as to handle such resin for blow-molding in the form of injection-molded hollow preforms of different sizes which are shaped like a test tube having external threads about their open ends. Employing the present invention, the body of the preform is uniformly heated to an orienting temperature but the threaded end is kept cool and unheated because such end is not to be blown.

Commonly used apparatus for locating and supporting preforms is described and illustrated in U.S. Pat. No. 4,185,812. Such apparatus includes a pallet per se which comprises—a pallet shuttle constituting a base on which the other members of the assembly are mounted; locator means on the shuttle for positively locating the shuttle relative to adjacent machine elements; a workpiece securing and locating assembly supported on the shuttle further comprising guide means mounted on the shuttle, a pair of jaws for engaging a workpiece therebetween mounted on the guide means, at least one of which jaws is reciprocally and adjustably movable between closed and open positions which, respectively, are the positions for securing a workpiece and for receiving or releasing a workpiece, means for biasing the jaws together, a workpiece locating member supported on the shuttle to receive and register a workpiece with reference to the shuttle to receive and register a workpiece with reference to the shuttle, the jaws being arranged to reciprocate and hold a workpiece against the locating member, and means supported on the shuttle to move the jaws apart to receive, secure, and release a workpiece. In the preferred embodiment of such prior art, the pallet is constructed so that it can be adjusted to accommodate different sizes of preforms (workpieces), including means to adjustably mount the jaws so that their spacing can be changed and removably mounting the locating member. A pair of the jaws is provided at each locating and support assembly. Each jaw has a preformed engaging end with a shallow V configuration. The other end of each jaw has a pair of elongated slots by means of which each jaw is a adjustably secured to a slide by a pair of bolts in tapped holes provided therefor. The slides are respectively mounted on a pair of spaced apart ways or guides which are circular in shape and fit into bushed holes on their respective sides of the pallet. The slides are biased together by a pair of helical springs in tension. In the central part of each slide is mounted a pair of stop buttons which serve as a means to positively locate and space the guide with reference to the locating and support assemblies or a co-planar surface that is part of a shuttle. The jaws can be spaced as needed by loosening the pair of bolts holding each jaw to its respective slide. When setting up the machine, locating and support assemblies of the correct size are installed, then a preform of the correct size is inserted in its proper position against the locating and support assemblies while the jaws are being held loosely by the respective bolts. The jaws are biased so that their V ends engage the preform and the bolts are tightened. Actuating means comprising an assembly of levers and cranks for transmitting motion to the slides cause the slides/jaw assemblies to move apart upon command.

Another prior art approach to gripping preforms is shown in FIG. 1. As depicted therein, the moving base member 10 is provided with a plurality of stations 12 each adapted to releasably grip a preform 14. Each station 12 comprises a gripping member 16 disposed within a heat shield 18. By depressing shaft 20 at each station 12, the gripping member 16 is extended, decreasing the diameter of a garter spring 22 disposed about the gripping member 16, which allows the gripping member 61 to be slid into the neck of a preform 14. When the shaft 20 is released, the garter spring 22 expands holding the preform onto the gripping member 16. By rotating the sprocket gear 24 at each station 12, the gripping member 16 and heat shield 18 are rotated in combination, with the intention of having the preform 14 rotated for even heating throughout except for the neck portion with the threads which is shielded by the heat shield 18. The prior art apparatus of FIG. 1 suffers from several shortcomings. For one, the gripping member 16 does not always maintain the preform 14 in a true axially-aligned state such that heating can be uneven. Depending on gravity for release, the preform 14 does not always come off the gripping member 16 when the shaft 20 is depressed, which can result in major problems and machine stoppage in the manufacturing process.

Both the above-referenced U.S. Pat. No. 4,185,812 apparatus and the apparatus of FIG. 1 suffer from a common problem, that is, it is a very time-consuming process to change over an assembly line from one size of preforms to another. In the case of the first described apparatus, each of the gripping members as above-described must be readjusted to properly grip the new preform. Since an adjustability feature is involved, there is always the opportunity for misalignment during the recalibration/readjustment process. In the latter-described apparatus of FIG. 1, the entire gripping member 16 at each station 12 must be replaced for a new size of preform. Typically, such a changeover can consume considerable time (4–8 hours in efficient plants to 2–4 days in non-efficient plants).

In the above-referenced patent application of which this application is a continuation-in-part, an improved gripping assembly is disclosed as shown in simplified form in FIG. 2. A plurality of cylindrical collets 26 are attached to the pallet 28, each having a plurality of spring metal fingers 30 peripherally located internally to snap around the neck 32 of the preform 14 below the threads thereof. Ejection of the preform 14 is accomplished under positive force by a member 34 on the end of a shaft 36 by which the preform 14 is pushed out from between the spring metal fingers 30. While applicant's above-described apparatus is an improvement over the prior art gripping apparatus described previously herein, it suffers from the same limitations when it comes to changing from one size preform to another; that is, each of the collets 26 throughout the machinery must be replaced.

Wherefore, it is the object of the present invention to provide gripping apparatus operating according to the manner of applicant's apparatus of FIG. 2 wherein the collets 26 are easily and quickly changed to effect a reconfiguration of the machinery for a different size preform.

SUMMARY

The foregoing object has been attained by the easily replacable collet assembly of the present invention intended for use in a movable pallet containing a plurality of stations for releasably gripping and rotating a plurality of resin preforms as they are moved through a blow molding process for providing rapid reconfiguration of the stations to accept different sized preforms. There is a mounting member carried by the pallet for rotation, the mounting member comprising a mounting plate perpendicular to a rotatable shaft connecting it to the pallet. A locking member is carried by the mounting member for rotation about the shaft. Finally, there is a collet member for releasably gripping a preform of a given size, the collet member including locking means for interacting with the locking member to releasably attach the collet member to the mounting plate to be moved in combination therewith.

In the preferred embodiment, the mounting plate is a circular disk and the locking member is a cylinder disposed about the disk. The circular disk has radially opposed bores therethrough; the collet member has a pair of collet pins projecting therefrom spaced to fit through the opposed bores when the collet member is disposed concentrically against the disk; and, the cylinder disposed about the disk has a closed end with an axial bore therethrough through which the shaft is disposed, the closed end acting as a locking plate and including locking means for releasably gripping the collet pins to releasably hold the collet member against the circular disk.

Also in the preferred embodiment, the collet pins have enlarged heads thereon and the locking means of the locking plate comprises a pair of opposed bulbous slots disposed to align with the opposed bores in the disk. The bulbous slots have enlarged ends for the heads of the collet pins to pass through and slot ends sized to prevent the heads from passing therethrough whereby the collet member can be releasably attached to the disk by passing the collet pins through the opposed bores and the enlarged ends and thereafter rotating the locking plate to position the slot ends under the heads of the collet pins. There is also detent means carried by the collet member for engaging the locking plate to prevent inadvertent rotation thereof when the heads of the collet pins are positioned over and are being held by the slot ends.

DESCRIPTION OF THE DRAWINGS

FIG. 4 is a top view of the inner collet of the present invention.

FIG. 5 is a top view of the combined heat shield and locking plate of the present invention.

FIG. 6 is a top view showing the manner in which the inner collet is releasably locked in place by the locking plate.

FIG. 7 is a simplified drawing of the detent employed in the present invention.

DESCRIPTION OF THE PREFERRED EMBODIMENT

Figure 3:
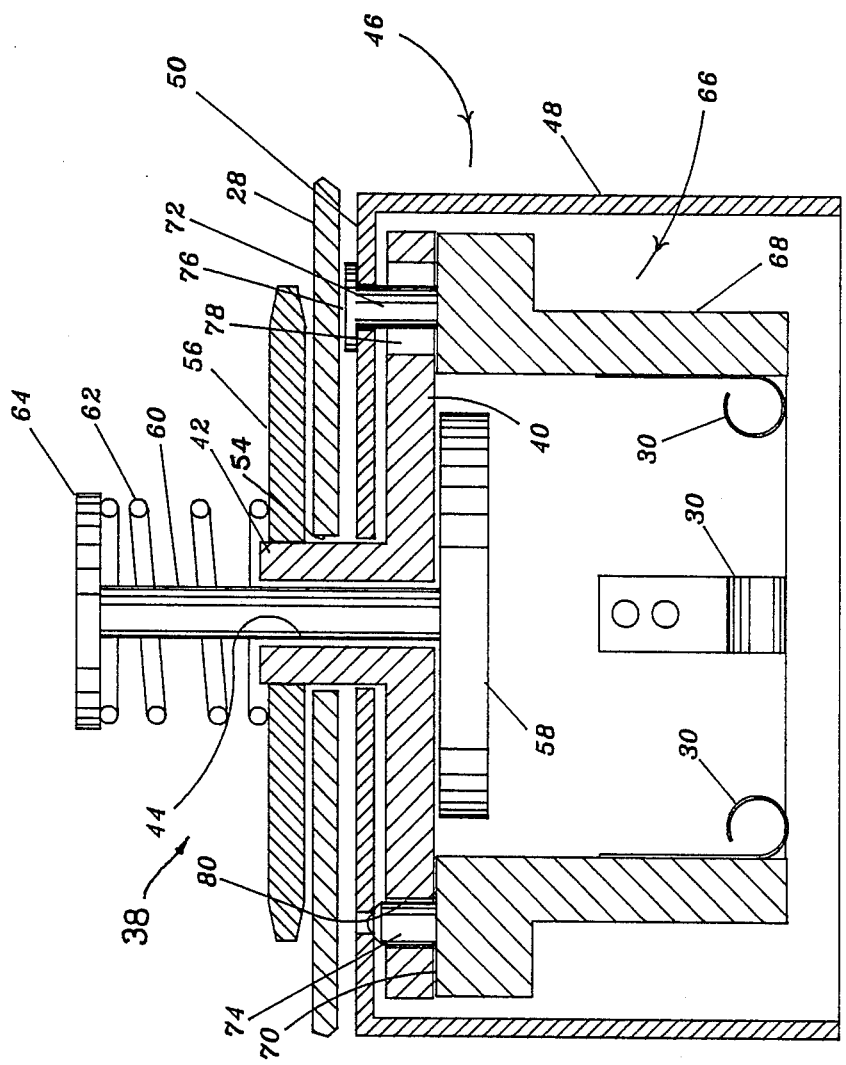
FIG. 3 is a partially cutaway side view of gripping and rotating apparatus according to the present invention.

A single station on a pallet 28 according to the present invention is shown in side view in FIG. 3 wherein it is generally indicated as 38. Each station 38 comprises a circular drive spindle disk 40 having a centrally located drive spindle shaft 42 with an axial bore 44 therethrough. A combined heat shield/locing plate 46 is disposed over the drive spindle disk 40. Heat shield-/locking plate 46 comprises a cylindrical heat shield 48 closed at the top end by a circular locking plate 50 having a central bore 52 therethrough through which the drive spindle shaft 42 is disposed, whereby the heat shield/locking plate 42 can be rotated about the drive spindle shaft 42. With the heat shield/locking plate 46 disposed over the drive spindle disk 40, the drive spindle shaft 42 is disposed through a bore 54 in the pallet 28 and a drive sprocket 56 is mounted thereon, whereby the drive spindle disk 40 and heat shield/locking plate 46 can be rotated in combination by rotation of the drive sprocket 56. A circular pusher disk 58 is mounted on the bottom end of a knockout rod 60 slidably disposed within the axial bore 44 of the drive spindle shaft 42. A coil spring 62 is disposed over the knockout rod 60 against the top of the drive sprocket 56 and held in place by a circular retainer 64 mounted on the upper end of the knockout rod 60. Spring 62 biases the pusher disk 58 to a raised position against the inner surface of the drive spindle disk 40. By a pressure against the retainer 64 compressing the spring 62, the pusher disk 58 can be pushed downward against a preform to release it when desired.

Figure 2:
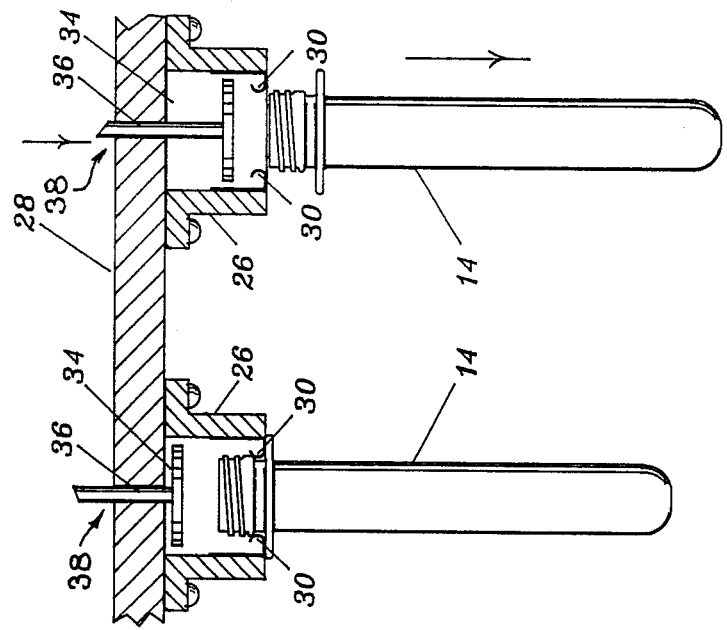
FIG. 2 is a simplified, partially cutaway drawing of applicant's basic gripping apparatus.
Figure 1:
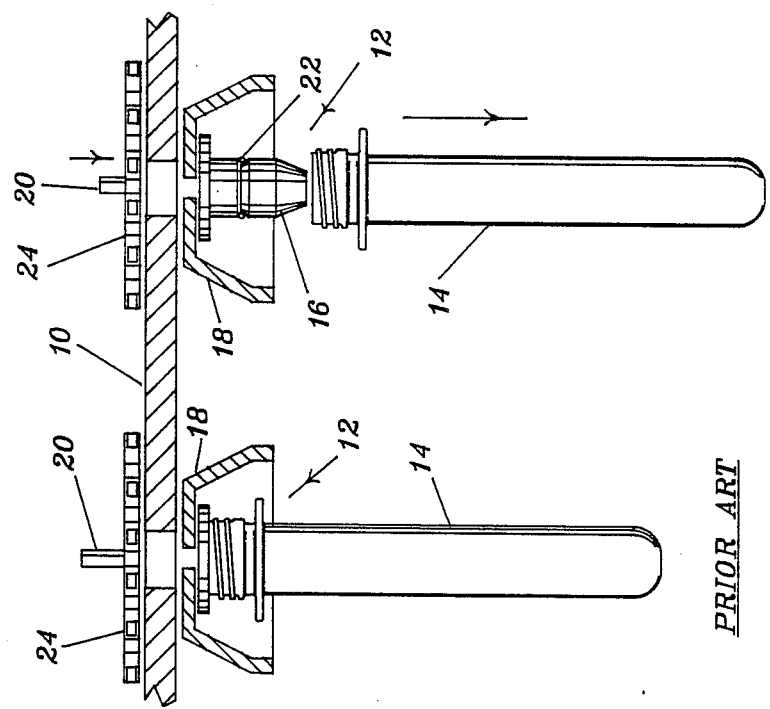
FIG. 1 is a simplified, partially cutaway drawing of prior art apparatus employed for releasably holding and rotating a preform for heating thereof.

Ease of adaptability is provided by an inner collet 66 constructed in the manner of applicants' invention of FIG. 2. By changing the inner collet 66, the stations 38 can be quickly and efficiently reconfigured to a new size preform. The inner collet 66 comprises a cylindrical gripping portion 68 having the spring metal fingers 30 of applicants' invention of FIG. 2 disposed peripherally around the bottom inner surface thereof for releasably gripping the neck 32 of a preform 14 in the manner previously described in detail in applicants' above-referenced applications. The cylindrical griping portion 68 has an internal diameter sized to fit about the pusher disk 58 and has a top planar surface 70 adapted to fit against the inner surface of the drive spindle disk 40. As best seen with reference to FIG. 4, there are a pair of opposed collet pins 72 extending upward from the surface 70 and a pair of opposed ball detent members 74 offset from the collet pins 72 also extending upward from the surface 70. The collet pins 72 each have a flattened head 76 of enlarged diameter thereon. The drive spindle disk 40 has a pair of opposed bores 78 therethrough through which the heads 76 of the collet pins 72 can pass. The drive spindle disk 40 also has a pair of opposed bores 80 therethrough through which the ball detent members 74 can slidably pass when the inner collet 66 is concentrically aligned with the drive spindle disk 40. As best seen in the top view of FIG. 5, the locking plate 50 has a pair of opposed bulbous slots 82 therethrough which can be rotated into alignment with the bores 78. The bulbous slots 82 have enlarged ends 84 sufficiently large enough for the heads 76 to pass therethrough communicating with slot ends 86 sized to fit around the collet pins 72 but insufficiently large enough for the heads 76 to pass therethrough. The locking plate 50 also has a pair of opposed bores 88 positioned to align with the detent members 74 when the collet pins 72 are within the slot ends 86 of the bulbous slots 82.

Each of the ball detent members 74 is constructed in the manner shown in FIG. 7 and comprises a cylindrical body 90 having a captive ball 92 and extending outward from the top thereof under bias force of a spring 94. To assemble the inner collet 66 to the drive spindle disk 40, the heat shield/locking plate 46 is rotated to place the enlarged ends 84 of the bulbous slots 82 in alignment with the bores 78. The collet pins 72 and ball detent members 74 are then inserted into the bores 78, 80, respectively, and the top planar surface 70 pushed tightly against the inner surface of the drive spindle disk 40. The ball 92 of each ball detent member 74 is compressed against the inside of the locking plate 50 and the heads 76 on the collet pins 72 pass beyond the top of the locking plate 50. The components then appear as shown in FIG. 6. With the inner collet 66 gripped for non-rotation, the heat shield 48 is gripped and rotated in the direction of the arrow 96. This causes the heads 76 to move over the slot ends 86 and for the balls 96 to snap into the bores 88 to prevent the locking plate 50 from reversing direction inadvertently to release the inner collet 66. To replace the inner collets 66 with others sized to grip another size preform for reconfiguration of the machinery, the above-described procedure is simply reversed. Thus, reconfiguration can be affected quickly and accurately in a matter of minutes instead of hours and days.

Wherefore, having thus described our invention, we claim:

1. In a movable pallet containing a plurality of stations for releasably gripping a plurality of workpieces as they are moved through a manufacturing process, the improvement for providing rapid reconfiguration of the stations to accept different sized workpieces wherein each station comprises:
   (a) a mounting member, at each station, including a mounting place perpendicular to a shaft rotatable relative to and supported by the pallet;
   (b) a locking member carried by said mounting member for rotation about said shaft; and,
   (c) a collet member for releasably gripping a workpiece of a given size, said collet member including locking means for interacting with said locking member to releasably attach said collet member to said mounting plate to be moved in combination therewith whereby to reconfigure the pallet for different sized workpieces said collet members are replaced with ones of said collet members sized to grip said different sized workpieces; wherein
   (d) said mounting plate has bores therethrough symmetrically disposed about said shaft;
   (e) said collet member has collet pins projecting therefrom spaced to fit through said bores when said collet member is disposed against said plate; and,
   (f) said locking member includes locking means for releasably gripping said collet pins to releasably hold said collet member against said plate.

2. The improvement to a movable pallet of claim 1 wherein:
   (a) said mounting plate is a circular disk; and,
   (b) said locking member is a cylinder disposed about said disk.

3. The improvement to a movable pallet of claim 2 wherein:
   (a) said collet pins have enlarged heads thereon; and,
   (b) said locking means of said locking member comprises a pair of opposed bulbous slots disposed to align with said opposed bores in said disk, said bulbous slots having enlarged ends for said heads of said collet pins to pass through and slot ends sized to prevent said heads from passing therethrough whereby said collet member can be releasably attached to said disk by passing said collet pins through said opposed bores and said enlarged ends and thereafter rotating said locking member to position said slot ends under said heads of said collet pins.

4. The improvement to a movable pallet of claim 3 and additionally comprising:
   detent means carried by said collet member for engaging said locking member to prevent inadvertent rotation thereof when said heads of said collet pins are positioned over and are being held by said slot ends.

5. The improvement to a movable pallet of claim 4 wherein:
   (a) said detent means comprises a spring-biased member; and,
   (b) said locking member has a bore therein positioned to receive said spring-biased member when said heads of said collet pins are positioned over and are being held by said slot ends.

6. The improvement to a movable pallet of claim 6 wherein:
said spring-biased member is a ball.

7. The improvement to a movable pallet of claim 2 wherein:
said cylinder is a heat shield for shielding a portion of a workpiece being held by said collet member.

8. The improvement to a movable pallet of claim 7 where the workpiece is a resin preform for a bottle in a blow molding operation and wherein:
 (a) said collet member fits over and releasably grips a neck portion of the bottle; and,
 (b) said heat shield shields the neck portion in a heating operation prior to blow molding of the remainder of the preform.

9. An easily replacable collet assembly for use in a moveable pallet containing a plurality of stations for releasably gripping a plurality of workpieces as they are moved through a manufacturing process for providing rapid reconfiguration of the stations to accept different sized workpieces, said collet assembly comprising:
 (a) a mounting member, including a mounting plate perpendicular to a shaft and rotatable relative to and supported by the pallet;
 (b) a locking member carried by said mounting member for rotation about said shaft; and,
 (c) a collet member for releasably gripping a workpiece of a give size, said collet member including locking means for interacting with said locking member to releasably attach said collet member to said mounting plate to be moved in combination therewith; wherein
 (d) said mounting plate has bores therethrough symmetrically disposed about said shaft;
 (e) said collet member has collet pins projecting therefrom spaced to fit through said bores when said collet member is disposed against said plate; and,
 (f) said locking member includes locking means for releasably gripping said collet pins to releasably hold said collet member against said plate.

10. The collet assembly of claim 9 wherein:
 (a) said mounting plate is a circular disk; and,
 (b) said locking member is a cylinder disposed about said disk.

11. The collet assembly of claim 10 wherein:
 (a) said collet pins have enlarged heads thereon; and,
 (b) said locking means of said locking member comprises a pair of opposed bulbous slots disposed to align with said opposed bores in said disk, said bulbous slots having enlarged ends for said heads of said collet pins to pass through and slot ends sized to prevent said heads from passing therethrough whereby said collet member can be releasably attached to said disk by passing said collet pins through said opposed bores and said enlarged ends and thereafter rotating said locking member to position said slot ends under said heads of said collet pins.

12. The collet assembly of claim 11 and additionally comprising:
 detent means carried by said collet member for engaging said locking member to prevent inadvertent rotation thereof when said heads of said collet pins are positioned over and are being held by said slot ends.

13. The collet assembly of claim 12 wherein:
 (a) said detent means comprises a spring-biased member; and,
 (b) said locking member has a bore therein positioned to receive said spring-biased member when said heads of said collet pins are positioned over and are being held by said slot ends.

14. The collet assembly of claim 13 wherein:
said spring-biased member is a ball.

15. The collet assembly of claim 10 wherein:
said cylinder is a heat shield for shielding a portion of a workpiece being held by said collet member.

16. The collet assembly of claim 15 where the workpiece is a resin preform for a bottle in a blow molding operation and wherein:
 (a) said collet member fits over and releasably grips a neck portion of the bottle; and,
 (b) said heat shield shields the neck portion in a heating operation prior to blow molding of the remainder of the preform.

17. An easily replacable collet assembly for use in a movable pallet containing a plurality of stations for releasably gripping and rotating a plurality of resin preforms as they are moved through a blow molding process for providing rapid reconfiguration of the stations to accept different sized preforms, said collet assembly comprising:
 (a) a mounting member supported by the pallet for rotation relative thereto, said mounting member comprising a mounting plate perpendicular to a rotatable shart by which the mounting plate is supported by the pallet;
 (b) a locking member carried by said mounting member for rotation about said shaft; and,
 (c) a collet member for releasably gripping a preform of a given size, said collet member including locking means for interacting with said locking member to releasably attach said collet member to said mounting plate to be moved in combination therewith; wherein
 (d) said mounting plate has bores therethrough symmetrically disposed about said shaft;
 (e) said collet member has collet pins projecting therefrom spaced to fit through said bores when said collet member is disposed against said plate; and,
 (f) said locking member includes locking means for releasably gripping said collet pins to releasably hold said collet member against said plate.

18. The collet assembly of claim 17 wherein:
 (a) said mounting plate is a circular disk; and,
 (b) said locking member is a cylinder disposed about said disk.

19. The collet assembly of claim 18 wherein:
 (a) said collet pins have enlarged heads thereon; and,
 (b) said locking means of said locking member comprises a pair of opposed bulbous slots disposed to align with said opposed bores in said disk, said bulbous slots having enlarged ends for said heads of said collet pins to pass through and slot ends sized to prevent said heads from passing therethrough whereby said collet member can be releasably attached to said disk by passing said collet pins through said opposed bores and said enlarged ends and thereafter rotating said locking member to position said slot ends under said heads of said collet pins.

20. The collet assembly of claim 19 and additionally comprising:

detent means carried by said collet memeber for engaging said locking member to prevent inadvertent rotation thereof when said heads of said collet pins are positioned over and are being held by said slot ends.

21. The collet assembly of claim 20 wherein:
(a) said detent means comprises a spring-biased member; and,
(b) said locking plate has a bore therein positioned to receive said spring-biased member when said heads of said collet pins are positioned over and are being held by said slot ends.

22. The collet assembly of claim 21 wherein:
said spring-biased member is a ball.

23. The collet assembly of claim 18 wherein:
said preform is a bottle preform having neck and body portions and said cylinder is a heat shield for shielding the neck portion of a preform being held by said collet member.

* * * * *

UNITED STATES PATENT AND TRADEMARK OFFICE
CERTIFICATE OF CORRECTION

PATENT NO. : 4,763,778
DATED : August 16, 1988
INVENTOR(S) : Frederick J. Feddersen et al It is certified that error appears in the above-identified patent and that said Letters Patent is hereby corrected as shown below:

Column 7, line 1, "6" should read -- 5 --;

line 28, "give" should read -- given --;

Column 9, line 1, "memeber" should read -- member --.

Signed and Sealed this

Twenty-third Day of May, 1989

Attest:

DONALD J. QUIGG

*Attesting Officer*  *Commissioner of Patents and Trademarks*